(12) United States Patent
Southland

(10) Patent No.: US 6,353,771 B1
(45) Date of Patent: Mar. 5, 2002

(54) RAPID MANUFACTURING OF MOLDS FOR FORMING DRILL BITS

(75) Inventor: Stephen G. Southland, Spring, TX (US)

(73) Assignee: Smith International, Inc., Houston, TX (US)

( * ) Notice: Subject to any disclaimer, the term of this patent is extended or adjusted under 35 U.S.C. 154(b) by 758 days.

(21) Appl. No.: 08/684,635

(22) Filed: Jul. 22, 1996

(51) Int. Cl.[7] .............................................. B29C 39/00
(52) U.S. Cl. ..................... 700/197; 76/108.1; 76/108.2; 76/115; 264/294; 125/15
(58) Field of Search .................... 364/475.02; 76/108.2, 76/108.1, 115; 428/34.4, 550; 175/336, 329; 264/294; 419/9; 521/140; 125/15; 700/197

(56) References Cited

U.S. PATENT DOCUMENTS

| | | | |
|---|---|---|---|
| 4,499,795 A | * 2/1985 | Radtke | 76/108 |
| 4,660,659 A | * 4/1987 | Short, Jr. et al. | 175/329 |
| 4,784,023 A | * 11/1988 | Dennis | 76/108 |
| 4,852,671 A | * 8/1989 | Southland | 175/329 |
| 4,884,477 A | 12/1989 | Smith et al. | 76/108 |
| 4,919,013 A | 4/1990 | Smith et al. | 76/108.2 |
| 4,944,817 A | 7/1990 | Bourell et al. | 156/62.2 |
| 5,000,273 A | 3/1991 | Horton et al. | 175/329 |
| 5,031,483 A | 7/1991 | Weaver | 76/107.1 |
| 5,088,047 A | 2/1992 | Bynum | 364/474.24 |
| 5,090,491 A | 2/1992 | Tibbitts et al. | 175/409 |
| 5,332,051 A | 7/1994 | Knowlton | 175/430 |
| 5,379,853 A | 1/1995 | Lockwood et al. | 175/428 |
| 5,433,280 A | 7/1995 | Smith | 175/336 |
| 5,471,970 A | * 12/1995 | Sakarcan | 125/15 |
| 5,544,550 A | * 8/1996 | Smith | 76/108.2 |

FOREIGN PATENT DOCUMENTS

| | | |
|---|---|---|
| EP | 606627 | 7/1994 |
| WO | 92 08567 | 5/1992 |
| WO | 96 11117 | 4/1996 |

OTHER PUBLICATIONS

Ashley, "Rapid Mold–Making for Investment Casting," *Mechanical Engineering*, vol. 114, No. 11, Nov. 1992, pp. 49–51.

DTM Corporation, Austin, Texas, "Dolphin Inc. Enhances Services, Meets Casting Challenges with DTM's Sinterstation™ 2000 System," *DTMonitor*, vol. 3, No. 2, Summer 1993, pp. 1–3.

Dvorak, "Rapid Prototypes for Production Parts," *Machine Design*, Oct. 8, 1993, pp. 48–50, 52, 54.

Helisys, Inc., Torrance, California, "The Power of LOM is Now within Reach," 2pp.

"Models in Minutes—and at Your Desk," *Machine Design*, Oct. 22, 1993, pp. 20, 23.

(List continued on next page.)

Primary Examiner—William A. Cuchlinski, Jr.
Assistant Examiner—McDieunel Marc
(74) Attorney, Agent, or Firm—Christie, Parker & Hale, LLP (57) ABSTRACT

A mold is formed for an building earth boring bit by designing the bit geometry in three dimensions using a computer aided design (CAD) system and then feeding the geometry data of the design to a layering device. The layering device then builds the mold a layer at a time. Materials used in building the mold include, sand, graphite, ceramic, clay, other refractory materials, plastic, rubber and wax. Once the mold is formed, powdered steel or tungsten carbide is poured into the mold and is cured by press molding or infiltrating with a binder forming a bit body. Cutting elements are then inserted in the bit body forming the earth boring bit.

36 Claims, 3 Drawing Sheets

OTHER PUBLICATIONS

Prioleau et al., "High–Powered Product Development—The Virtual Vision Store," *Pro/E™ The Magazine*, vol. 1, No. 2, Fall 1993, pp. 2–4.

ProtoTech Services, Inc., Eden Prairie, Minnesota, "ProtoTech Engineering Applies Finishing Touch to Stereolithography," pp. 36–37.

ProtoTech Services, Inc., Eden Prairie, Minnesota, "From CAD to Prototype in Minutes," 4pp.

"Rapid Mold Maker Promises Faster Metal Prototypes," reprinted from *Machine Design*, Nov. 26, 1992, 2pp.

Soligen, Northridge, California, "Direct Shell Production Casting," 6pp.

Soligen, Northridge, California, "Soligen Announces DSPC™ Machine Order by Ashland Chemical," *Soligen News Release*, Jul. 14, 1993, 1p.

Soligen, Northridge, California, "Soligen Demonstrates Fast Production of Casting Molds is Feasible," *Soligen News Release*, Aug. 17, 1993, 1p.

Soligen, Northridge, California, "Soligen Demonstrates Surface Finish Improvement for Casting Process," *Soligen News Release*, Nov. 8, 1993, 1p.

Soligen, Northridge, California, "Technology Backgrounder," May 1993, 2pp.

Stratasys™ Inc., Eden Prairie, Minnesota, "FDM® 1000 Series of Rapid Prototyping Systems," 5pp.

Tait, "Cashing in on Rapid Prototyping (859)," AutoFact '93 Conference, Chicago, Illinois, Nov. 7–11, 1993, 6pp.

Teague et al., "Prototyping Expands Design's Portfolio," reprinted from *Design News*, Jun. 21, 1993, 4pp.

Uziel, "An Unconventional Approach to Producing Investment Castings," reprinted from *Modern Casting*, Aug. 1993, 2pp.

"Advancements in Rapid Prototyping (337)," AutoFact '93 Conference, Chicago, Illinois, Nov. 7–11, 1993, 3pp.

\* cited by examiner

RAPID MANUFACTURING OF MOLDS FOR FORMING DRILL BITS

BACKGROUND

Earth boring drill bits, such as polycrystalline diamond composite insert drag bits are used for drilling earth formations. For optimum drilling efficiency, the design of the bit is tailored for the type of earth formation to be drilled. This requires that the earth formation be analyzed and a bit geometry be designed. Once the bit is designed, a mold must be built for forming the bit.

To save time, it has been suggested that the process of rapid prototyping be used to build a bit. See for example, U.S. Pat. No. 5,433,280. This process builds the bit a layer at a time. Each layer is bonded to previous layer. The bonding may be caused by sintering subsequent layers together. This layer by layer sintering results in a bit that is weaker than a bit conventionally formed using a mold.

Rapid prototyping techniques, as the name suggests, are used to develop a prototype which has been designed in three dimensions using a computer aided design (CAD) system. These prototypes are used to evaluate the design and do not have the precise tolerances that are required of bits. As a result, a bit manufactured using this process may have to be machined to proper tolerances.

Accordingly, a process for building a bit is desired that reduces the time required to build a bit after a formation to be drilled has been analyzed, that uses existing bit materials, and which provides for precise tolerances.

SUMMARY OF THE INVENTION

This invention relates to a method for forming a mold which is used to form earth boting bits, such as polycrystalline diamond compact (PDC) insert drag bits. Once an earth formation to be drilled is analyzed, a three dimensional solid model of the bit is designed using a computer aided design (CAD) system. The system feeds the geometry data of the bit design to a layering device. The layering device divides the solid model in thin cross-sectional layers (also referred herein as CAD layers) revealing a cross-sectional outer mold line. It then proceeds to build the mold a layer at a time, such that each layer defines an inner mold line which is identical to the outer mold line of a corresponding CAD layer. Materials to be used for forming the mold include sand, graphite, ceramics, clay, other refractory materials plastic, rubber and wax. With the exception of the plastic, rubber and wax, the mold materials may be coated with a binder or a resin which allows for the melting of the binder or resin for fusing the mold material to construct a green state mold. Fusing of the mold material to construct a green state mold or sintering of the mold material can be accomplished by exposure of the mold material to high temperatures or $CO_2$ gas.

In one embodiment, a laser beam is used to trace a layer of mold material having a thickness equivalent to that of a corresponding CAD layer. The laser traces the mold material defining an inner mold line which is identical to the outer mold line of a corresponding CAD layer. The laser beam can sinter or fuse the mold material layer. In another embodiment, the layering device lays out a precise layer of mold material defining an inner mold line identical to the outer mold line of a corresponding CAD layer. With this embodiment, each subsequent layer is exposed to a high temperature to either fuse or sinter the layers together. In a further embodiment, a model of the CAD bit design is built by the layering device using wax. The wax model is suspended in a mold casing in which is poured a mold material. The mold material is then cured to a green state and the wax is heated to a gaseous state so that it evaporates revealing the mold.

In yet a further embodiment, the layering device is used to construct reusable flexible formers using a flexible i.e., plastic or rubber material. The formers are used to form a mold or portions of a mold which is then used to form the bit.

In an alternate embodiment, the layering device is used to construct a master bit from preferably rubber or plastic. The master bit is then used to form molds from which are formed the bit bodies.

Once a mold is formed, a powdered steel or tungsten bit material is poured into the mold and is press molded or infiltrated with a binder to form the bit.

DETAILED DESCRIPTION

The invention relates to a method for forming a mold which is used to build earth boring bits such as polycrystalline diamond compact (PDC) insert drag bits, roller cone and percussion bits. For descriptive purposes only reference to a PDC insert drag bit is made herein. However, as it would become obvious to one skilled in the art, the method described herein can be used to form all type of earth boring bits. These bits have bodies onto which are mounted cutting elements, such as PDC inserts or rotary cutter cones in case of a PDC drag bit or rotary cone bit, respectively.

An earth formation to be drilled is analyzed to determine the optimum design for the bit. Based on this analysis, a bit geometry is designed in three dimensions using a conventional computer aided design (CAD) system. The three dimensional design is commonly referred to as a solid model. The CAD system may not generate a totally new bit design, but more usually, the designer simply makes modifications in angles, curvatures and dimensions to an existing design to adapt the design for drilling a specific earth formation.

The CAD system then generates a geometry design of a mold for producing the bit. In an alternate embodiment, the mold is designed directly with the CAD system. In a further embodiment, a mold is designed in sections which interconnect to form the mold. In another embodiment, reusable formers are designed which are used as a secondary mold for forming a primary mold which is used for forming the bit. The formers can be used for forming a section of the primary mold. These sections are then connected to form the primary mold. Or, the formers can be connected for forming the primary mold as a single unit. The formers can also be used to form junk slot, blank or nozzle drop-ins. These drop-ins are sometimes referred to as "patterns." The drop-ins are used in conjunction with a mold for the purpose of forming openings, cavities or passages in the bit formed as a complement to the mold. In yet a further embodiment, the drop-ins are designed directly using the CAD system. Such variations will be apparent from the following description.

Figure 1:
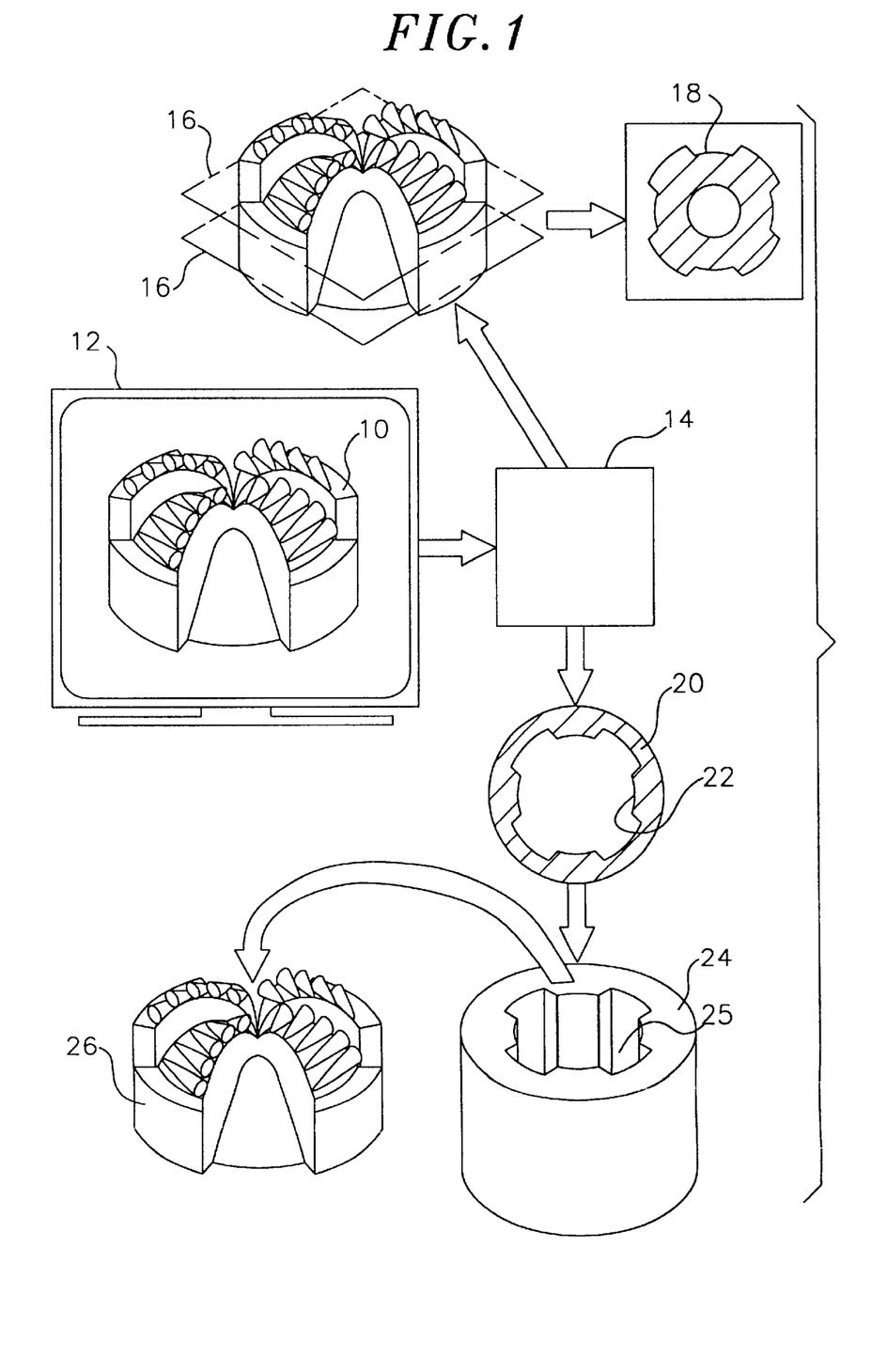
FIG. 1 depicts a flow chart for forming a mold using a layering device which is fed data from a CAD system.

Referring to FIG. 1, each bit design 10 generated with the CAD system 12 has a geometry data file associated with it. The geometry data file contains data defining the geometry of the generated bit design. The geometry data file can be stored and later retrieved if earth formations need to be drilled which require a similar bit geometry.

The geometry data is passed to a conventional layering device 14 which is used to build a mold, a section of a mold, or a former which will be used to construct a mold. The layering device divides the solid model using horizontal planes 16 into thin cross-sectional, two-dimensional, layers revealing a cross-sectional outer mold line 18 of the desired bit shape. The device then builds the mold one layer at a time with the inner mold line of the mold being the exact complement of the outer mold line of the desired bit. Typical layers have thicknesses ranging from 0.003 to 0.020 inches.

The technique of using a layering device to build a structure designed by a CAD system is commonly used for the fabrication of prototype three dimensional objects and is commonly referred to as a "rapid prototyping process." With the present invention, however, the technique is used to build a mold or formers for forming a mold for a drag bit, not a prototype. The advantage of using the layering device to build a mold and not an actual part is that dimensional precision is required only on the mold surfaces, i.e., the surfaces of the mold that are used for producing the bit. The outer surface of the mold can be quite irregular and bear little relation to the inner mold line. Another advantage of using this technique is that it can be used in conjunction with current bit materials for forming the bits.

There are various layer building techniques that can be embodied in building a mold or mold sections. In one embodiment, laser sintering is used in forming the mold a layer at a time. With this embodiment, a thin layer of mold material 20 is laid on a platform. The mold material can be sand, graphite, ceramic, clay, other refractory material, plastic, rubber or wax. A laser is then used to trace a respective CAD solid model outer mold line as the mold material layer inner mold line 22, sintering the mold material to construct a cross-section of the mold having the traced inner mold line. Another layer of mold material is then laid on top of the formed mold layer and the process is repeated until a mold 24 is built.

In the preferred embodiment, the mold material i.e., sand, graphite, ceramic, clay, or other refractory material is coated with a resin or a binder. With this embodiment, the tracing laser is used to fuse the coating or the binder by heating the mold material to the melting temperature of the coating or binder, which is lower than the melting temperature of the refractory material, thereby fusing the coating or binder. This results in the bonding of the refractory material particles, as well as the bonding of adjacent layers resulting in a "green" state mold which can be easily machined when necessary to assure precise tolerances in dimensionally critical areas.

A green state part is a part which has not been cured to its final state but which has been cured sufficiently to allow for handling and machining. The advantage in building a green mold first is that a green mold is easier to machine, for achieving the required tolerances, than a fully cured mold. The consistency of the green state mold can be controlled by varying the coating or binder, the infiltrant, or the mold materials used or by controlling the temperature to which the coating or binder is exposed.

In another embodiment, the layering device precisely lays a mold material layer defining a mold cross-sectional shape having an inner mold line 22 equivalent to the outer mold line 18 of a corresponding CAD solid model layer. The layering device precisely lays mold material constructing a layer with a thickness equal to that of a corresponding CAD solid model layer wherein the layer has an inner mold line equivalent to the corresponding CAD layer outer mold line.

With this embodiment, the mold material used to construct each layer may still be sand, graphite, ceramic, clay, or other refractory material coated with a resin or a binder. As each layer is laid, the layer is subjected to the melting temperature of the coating or binder, fusing the coating or binder, and bonding the layer mold material together as well as with other layers for forming a green state mold. As with the previous embodiment, the mold material layers can also be sintered to directly construct a mold in its final cured state. In such case, the mold material used to construct the mold may not be coated with a resin or binder and may be a plastic, rubber or wax type material.

As an alternative to this embodiment, the present technique is used to form the bit directly. Preferably the bit is formed from plastic or rubber. The bit formed can be machined if necessary to achieve precise tolerances. The plastic or rubber bit can then be used to make several identical molds.

Figure 2:
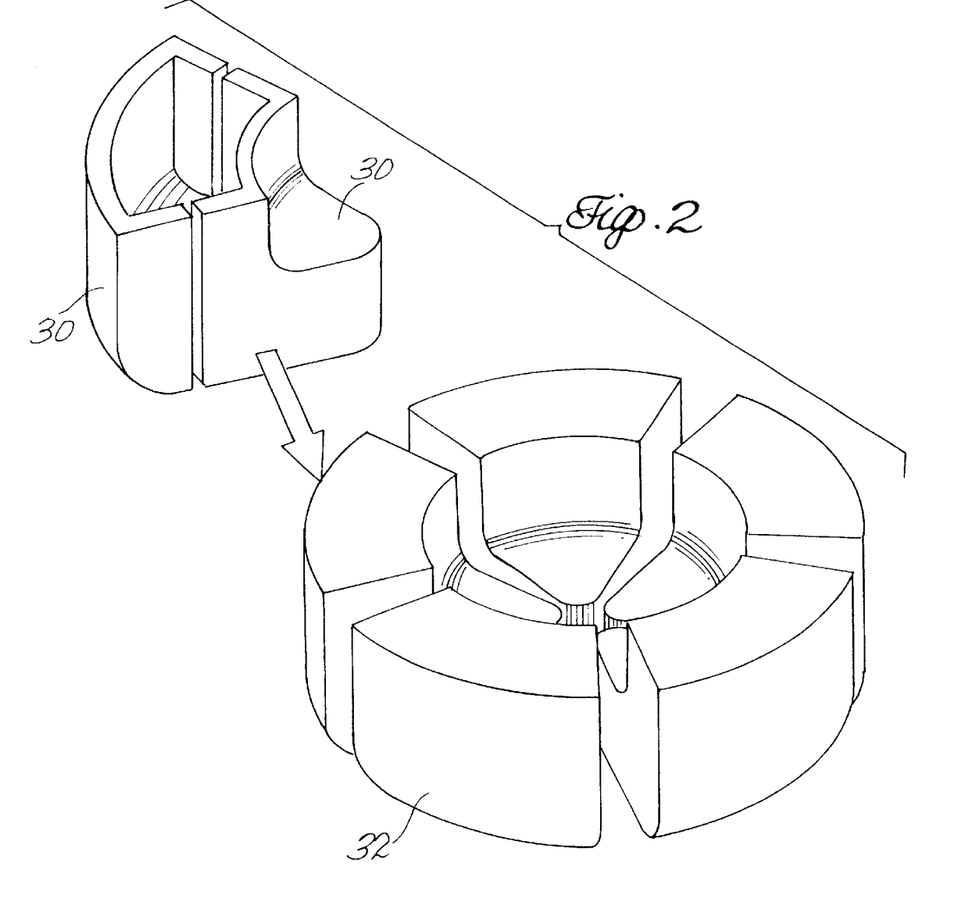
FIG. 2 depicts formers and junk slot drop-ins formed by the formers.

In another embodiment, the layering device is used to build formers. The formers are typically made from a flexible material such as plastic. The formers are connected together to form a secondary mold which is used to form a primary mold which is used to form the bit. The formers can be used to form sections of the primary mold which are then connected to form the primary mold, or they can be used to form an unitary primary mold. The formers 30 (FIG. 2) can also be used to form junk slot drop-ins 32 or other blank or nozzle drop-ins (not shown) or other patterns for forming voids, passages or the like in a drag bit.

The formers can be self interlocking or they may require external fastening means for interconnecting. As with the mold geometries discussed above, the former geometry passed to the layering device may be generated by the CAD system as a complement to a CAD designed bit geometry or may be designed directly using the CAD system. Typically, the formers are layer formed from plastic or rubber material. The advantage of using formers is that they are reusable. Only a small amount of plastic material is used to form the formers. As such, they provide a quick and relative inexpensive way of producing a mold. Since they are not used to form the bit directly, their tolerances do not need to be as tight as those of the mold which is used to form the bit. Once a primary mold is formed using the formers, the mold can be machined to precise tolerances.

To form the mold using the formers, a mold material which preferably may contain sand, graphite, ceramic or clay coated with a resin or binder is poured into the secondary mold formed by connecting the formers. The mold material is then infiltrated with $CO_2$ gas which reacts with the coating or binder for setting the mold to either a green state or a final state. Infiltration with $CO_2$ is preferable since the temperatures required for setting the mold may be higher than the melting temperature of the former material. Once the mold is set, the formers are removed.

Figure 3:
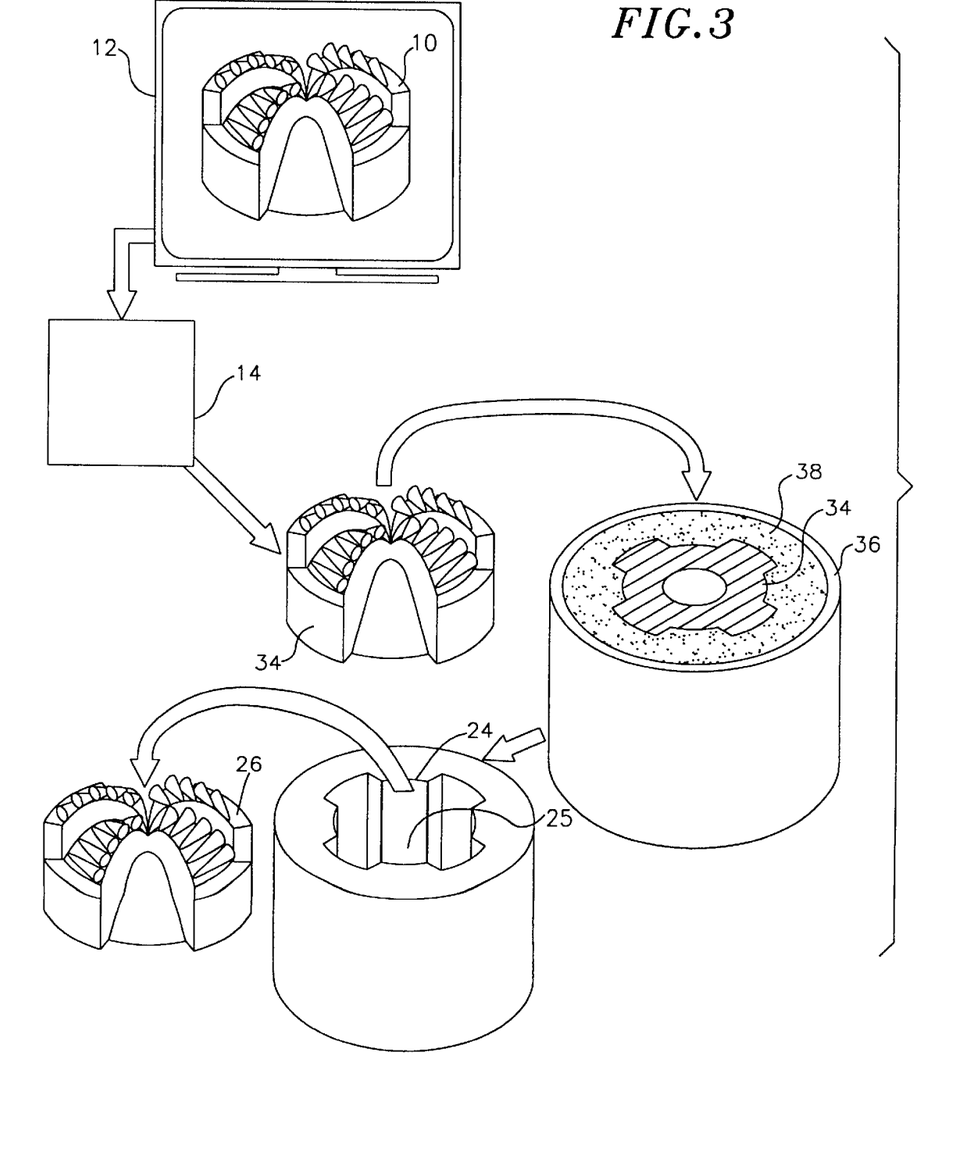
FIG. 3 depicts a flow chart for forming a mold using a wax bit model formed by a layering device which is suspended in a mold assembly.

In another embodiment shown in FIG. 3, a wax model 34 is formed identical to a CAD solid model bit design with the layering device 14. The wax is precisely laid through a conventional layering device. After it is formed, the wax mold is suspended in a mold assembly 36. A mold assembly is a bucket-like case. Liquid or particulate mold material 38 is poured between the case walls and the wax model. The mold material may contain powders, liquids, sand, graphite, ceramic, clay, plastic or rubber. As with the previous embodiments, the particulate mold materials may have a binder or resin coating. The mold assembly is cured to its final state and the wax is melted from the mold or heated to a gaseous state whereby the gas evaporates and the cured mold material defines the bit forming mold 24. This is analogous to a lost wax process, except that the wax model is made by a CAD layering technique.

In a further embodiment, the mold material in the mold assembly is cured to a green state at which point the wax is removed from the assembly either by melting or heating to a gaseous state, revealing a green state mold. The green state mold is machined, if necessary, to achieve proper tolerances and then cured to its final state.

In yet a further embodiment, a wax mold is built using the layering device as described in the embodiments above and as shown in FIG. 1. The wax mold 24 has an opening 25 to allow for pouring of the bit material which will form the bit. The bit material is poured into the mold opening and the mold and bit material are partially cured for forming a "green" bit head. The wax mold surrounding the bit head is then heated to a liquid state so that it flows from the bit head.

By forming a green state mold, the mold being "soft" may be easily machined to precise tolerances. After proper tolerances are achieved, the mold can be further cured to its final state. This can be accomplished by infiltrating the mold with or without a binder, or $CO_2$ gas, or press molding it cold or at temperature with or without a binder, or heating it.

In an alternate embodiment, a mold produced as per any aforementioned embodiment can be used to produce a mold for producing a master bit from preferably plastic or rubber materials. The master bit can then be used to produce duplicate molds.

Moreover, it should be apparent to one skilled that the drop-ins or patterns can be build as per any of the aforementioned embodiments. For example, a layering building technique can be used to form a drop-in from sand, graphite, ceramic, clay, other refractory material, plastic, rubber, or wax.

Typically, to remove a mold from a part formed as its complement, it is required that the mold be broken or "crumbled" off. It is, therefore, a recommended practice that the mold is not infiltrated or cold-pressed with a strong binder so that it does not set in a very hard state where breakage or "crumbling" of the mold off a part is difficult. The consistency of the mold can be tailored and is a function of the mold material and material coatings used to form the mold, the infiltrants used and the curing temperatures to which the mold is subjected. Thus, with the described embodiments, molds can be formed which vary in consistency from very soft and very pliable, to very hard and not pliable.

In all of the described embodiments, powdered steel or tungsten carbide is poured into the mold opening 25 to form the bit 26. The mold and the bit material in the mold are cured to form a green state bit. In an alternate embodiment, a mold made of plastic or rubber material in accordance with any of the aforementioned embodiments is used to press mold a green bit without exposure to high temperature. In other words, the mold is filled with the powdered steel or tungsten carbide material with or without a binder and then is press molded, either cold or at temperature, to form a green state bit.

The green bit is then removed from the mold. If necessary the bit can be machined to appropriate tolerances. The bit is then pressed or infiltrated with a binder whereby it is in its final state as an integral body. The bit may also be pressed or infiltrated with a binder while in the mold. PDC inserts or other cutting elements may then be mounted on the bit body.

Although this invention has been described in certain specific embodiments, many additional modifications and variations will be apparent to those skilled in the art. It is, therefore, understood that within the scope of the appended claims, this invention may be practiced otherwise than specifically described.

What is claimed is:

1. A method for making an earth boring bit having cutting elements comprising the steps of:
   determining a bit body geometry desired for drilling a specific earth formation;
   generating a computer aided design of the bit body geometry;
   employing an automated layering device for constructing a mold based on the computer aided design;
   forming a bit body in the mold having the desired geometry as a complement to the mold; and
   mounting cutting elements on the bit body.

2. A method as recited in claim 1 further comprising the step of machining the mold to desired dimensions before forming the bit body.

3. A method as recited in claim 1 wherein the employing step comprises:
   dividing the computer aided geometry design into a plurality of layers wherein each layer defines a bit geometry cross-section outer mold line;
   laying a layer of mold material having a thickness equal to a thickness of a corresponding computer aided geometry design layer; and
   tracing the outer mold line of a corresponding computer aided geometry layer as an inner mold line on the mold material layer with a laser beam for bonding the material traced.

4. A method as recited in claim 3 wherein the tracing step comprises the step of sintering the material traced.

5. A method as recited in claim 3 wherein the step of dividing comprises the step of dividing the computer aided geometry design into layers having a thickness in the range of from about 0.003 to 0.020 inches.

6. A method as recited in claim 3 wherein the step of laying a layer of mold material comprises laying a layer of material selected from the group consisting of sand, graphite, ceramics, clay, other refractory materials, plastics, rubbers and waxes.

7. A method as recited in claim 3 wherein the step of laying a layer of material comprises the step of laying a layer of particulate material coated with a resin or binder and wherein the tracing step comprises the step of fusing the coating or binder for bonding the material particles together and to an adjacent material layer for forming a green state mold.

8. A method as recited in claim 1 wherein the employing step comprises:
   dividing the computer aided geometry design into a plurality of layers wherein each layer defines a bit geometry cross-section outer mold line;
   laying a layer of material having a cross-sectional inner mold line corresponding to a respective computer aided design geometry layer outer mold line; and
   bonding the layer to an adjacent layer.

9. A method as recited in claim 8 wherein the bonding step comprises the step of sintering the layer of material.

10. A method as recited in claim 8 wherein the bonding step comprises fusing a resin or binder coated on the material to form a green state mold.

11. A method as recited in claim 1 wherein the employing step comprises the step of forming a green state mold and further comprising the step of curing the green state mold.

12. A method as recited in claim 11 wherein the step of curing the green state mold comprises the step of heating the green state mold.

13. A method as recited in claim 11 wherein the step of curing the green state mold comprises the step of press molding the green state mold.

14. A method as recited in claim 11 wherein the step of curing the green state mold comprises the step of infiltrating the green state mold with $CO_2$ gas.

15. A method as recited in claim 1 further comprising the steps of:

generating a computer aided design of a drop-in;

employing the layering device for constructing formers for forming the drop-ins for the mold responsive to the computer generated design;

interconnecting the formers to form a second mold;

forming a drop-in as a complement to the second mold,; and placing the drop-ins in the mold prior to forming the bit body.

16. A method as recited in claim 1 further comprising the steps of:

generating a computer aided design of a drop-in;

employing the layering device for constructing drop-ins for the mold responsive to the computer generated design; and placing the drop-in in the mold prior to forming the bit body.

17. A method according to claim 1 wherein the employing step comprises constructing a plurality of sections of a mold employing an automated layering device and the method further comprises assembling a plurality of the sections for constructing the mold.

18. A method according to claim 1 wherein the forming step comprises the steps of:

placing powder in the mold selected from the group consisting of steel and tungsten carbide; and binding the powder into an integral body.

19. A method as recited in claim 18 wherein the binding step comprises the step of press molding the powder.

20. A method as recited in claim 18 wherein the binding step comprises the step of infiltrating the powder with a binder.

21. A method for making an earth boring bit having cutting elements comprising the steps of:

determining a bit body geometry desired for drilling a specific earth formation;

generating a computer aided design of the bit body geometry;

employing an automated layering device for constructing a wax model based on the computer aided design;

forming a mold as a complement to the wax model; and forming a bit body having the determined geometry as a complement to the mold; and mounting cutting elements on the bit body.

22. A method as recited in claim 21 wherein the forming a mold step comprises the steps of:

suspending the wax model in a mold assembly;

pouring a mold material in the mold assembly around the suspended wax model;

curing the mold material; and removing the wax model, revealing a mold complementary to the wax model.

23. A method as recited in claim 22 wherein the removing step comprises the step of heating the wax to a fluid state.

24. A method as recited in claim 22 wherein the removing step comprises the step of heating the wax to a gaseous state.

25. A method as recited in claim 21 wherein the forming a bit step comprises the steps of:

placing powder metal in the mold; and infiltrating the powder with a binder.

26. A method as recited in claim 21 wherein the forming a bit step comprises the steps of:

placing powder metal in the mold; and press molding the powder with the mold.

27. A method for making an earth boring bit comprising the steps of:

determining a bit body geometry desired for drilling the earth formation;

generating a computer design of formers for forming a secondary mold;

employing a layering device for constructing the formers based on the computer aided design;

interconnecting the formers to construct a secondary mold;

forming a primary mold as a complement to the secondary mold;

forming a bit body having the determined geometry as a complement to the primary mold; and mounting cutting elements on the bit body.

28. A method as recited in claim 27 wherein the step of forming a primary mold comprises the step of forming a section of the primary mold, the method further comprising the step of connecting the section of the primary mold with other sections of the primary mold to form the primary mold.

29. A method as recited in claim 27 wherein the employing step comprises employing a layering device to construct flexible formers.

30. A method as recited in claim 27 wherein the forming the primary mold step comprises the steps of:

pouring a mold material coated with a resin or binder into the secondary mold; and setting the mold material by infiltrating it with $CO_2$ gas.

31. A method as recited in claim 27 wherein the forming the bit body step comprises placing powder in the mold selected from the group consisting of steel and tungsten carbide; and binding the powder into an integral body.

32. A method as recited in claim 31 wherein the binding step comprises the step of press molding the powder with the mold.

33. A method as recited in claim 31 wherein the binding step comprises the step of infiltrating the powder with a binder.

34. A method as recited in claim 27 further comprising the steps of:

employing the layering device for constructing formers for forming a drop-in required by the mold;

interconnecting the formers to construct a third mold;

forming a drop-in as a complement to the third mold; and placing the drop-in in the mold.

35. A method for making an earth boring bit having cutting elements comprising the steps of:

determining a bit body geometry desired for drilling a specific earth formation;

generating a computer aided design of the bit body geometry;

employing an automated layering device for constructing a master mold based on the computer aided design;

forming a master bit body as a complement to the master mold;

forming a secondary mold as complement to the master bit body;

forming a bit body in the secondary mold having the desired geometry as a complement to the secondary mold; and mounting cutting elements on the bit body.

36. A method as recited in claim 35, wherein the master bit is made of a material selected from the group consisting of rubbers and plastics.

* * * * *

UNITED STATES PATENT AND TRADEMARK OFFICE
CERTIFICATE OF CORRECTION

PATENT NO.    : 6,353,771 B1
DATED         : March 5, 2002
INVENTOR(S)   : Stephen G. Southland It is certified that error appears in the above-identified patent and that said Letters Patent is hereby corrected as shown below:

<u>Title page,</u>
Item [56], References Cited, U.S. PATENT DOCUMENTS, insert the following:

| | | | |
|---|---|---|---|
| 4,028,288 | 6/1977  | Turner          | 521/140 |
| 4,793,968 | 12/1988 | Mosser et al.   | 428/550 |
| 4,797,251 | 1/1989  | Sakuramoto et al. | 419/9 |
| 4,884,477 | 12/1989 | Smith et al.    | 76/108.2 |
| 4,913,871 | 4/1990  | Kawaguchi et al. | 264/294 |
| 5,433,280 | 7/1995  | Smith           | 175/336 |
| 5,543,186 | 8/1996  | Andersen et al. | 428/34.4 |
| 5,544,550 | 8/1996  | Smith           | 76/108.2 |

Item [57], ABSTRACT,
Line 1, replace "for an building" with -- for building an --.
Line 6, after "include" delete the comma.

<u>Column 1,</u>
Line 15, before "previous" insert -- a --.
Line 34, replace "boting" with -- boring --.
Line 41, after "referred" insert -- to --.
Line 46, after "materials" insert a comma.

<u>Column 2,</u>
Line 6, replace "flexible i.e.," with -- flexible, i.e., --.

<u>Column 3,</u>
Line 16, replace "inches" with -- inch --.
Line 45, replace "material i.e.," with -- material, i.e., --.

<u>Column 4,</u>
Line 33, replace "an unitary" with -- a unitary --.

<u>Column 5,</u>
Line 36, after "skilled" insert -- in the art --.
Line 37, replace "build" with -- built --.

UNITED STATES PATENT AND TRADEMARK OFFICE
CERTIFICATE OF CORRECTION

PATENT NO. : 6,353,771 B1
DATED : March 5, 2002
INVENTOR(S) : Stephen G. Southland It is certified that error appears in the above-identified patent and that said Letters Patent is hereby corrected as shown below:

Column 6,
Line 44, replace "inches" with -- inch --.

Column 10,
Line 1, after "mold as" insert -- a --.

Signed and Sealed this

Twelfth Day of August, 2003

JAMES E. ROGAN
*Director of the United States Patent and Trademark Office*